No. 707,175. Patented Aug. 19, 1902.
J. H. STEFFEY.
GLAZED STRUCTURE.
(Application filed Apr. 19, 1902.)
(No Model.)
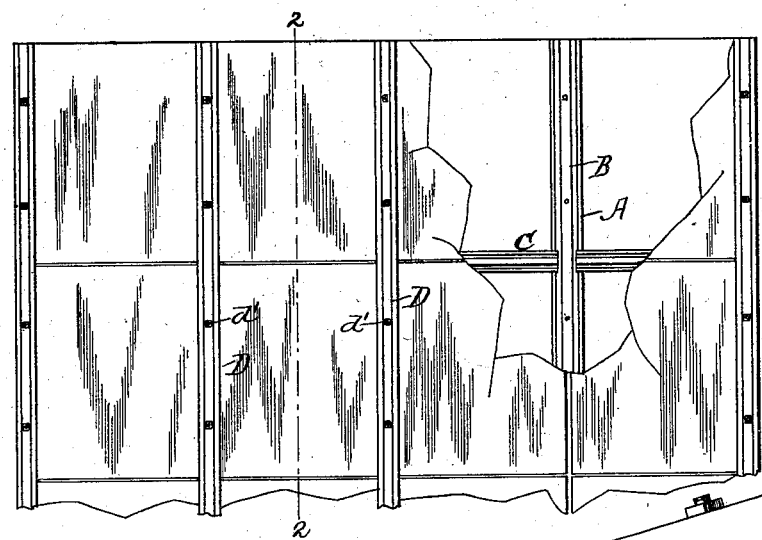
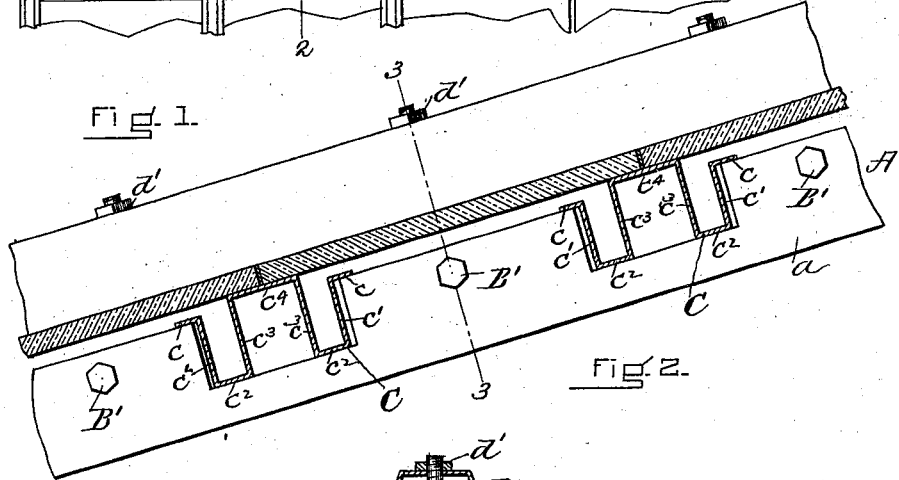
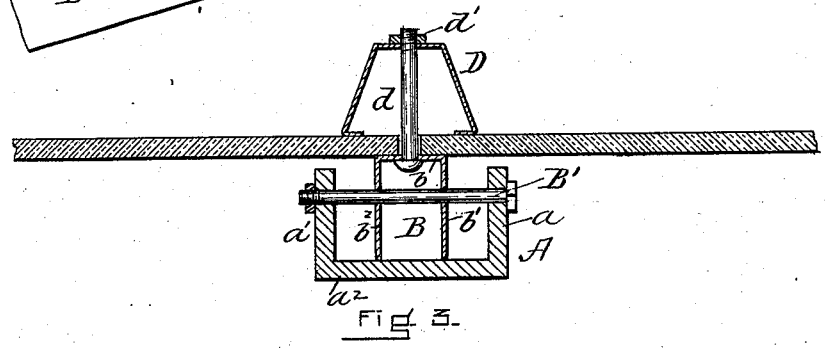
WITNESSES. INVENTOR.

UNITED STATES PATENT OFFICE.

JOSIAH H. STEFFEY, OF BOSTON, MASSACHUSETTS, ASSIGNOR TO E. VAN NOORDEN COMPANY, OF BOSTON, MASSACHUSETTS, A CORPORATION OF MASSACHUSETTS.

GLAZED STRUCTURE.

SPECIFICATION forming part of Letters Patent No. 707,175, dated August 19, 1902.

Application filed April 19, 1902. Serial No. 103,711. (No model.)

*To all whom it may concern:*

Be it known that I, JOSIAH H. STEFFEY, a citizen of the United States, and a resident of Boston, in the county of Suffolk and State of Massachusetts, have invented a new and useful Improvement in Glazed Structures, of which the following is a full, clear, and exact description, reference being had to the accompanying drawings, forming a part of this specification, in explaining its nature.

My invention relates to means for the support and retention of the panes of glass, and provides an improved system of drainage by which the water of condensation which accumulates upon the interior surfacing of the glass may be carried off.

My invention consists, therefore, in the means for accomplishing this result and will best be understood by reference to the drawings, in which—

Figure 1 is a view in plan of the glazed structure. Fig. 2 is a vertical section on line 2 2 of Fig. 1. Fig. 3 is a cross-section on line 3 3 of Fig. 2.

Referring to the drawings, A represents the main troughs or channel-bars, preferably formed, as represented, to have the sides $a\ a'$ and the bottom $a^2$. They are held in place by any suitable structure or means of support and generally in an inclined position. They lie in parallel lines, and their arrangement is such that the panes of glass may meet approximately over each trough center and rest along their edges upon the glass-supporting center piece B. These glass-supports B extend the length of the trough in which they lie and comprise the top plate $b$, upon which the glass properly rests, and the sides $b'\ b^2$. They are held in place by the bolts B', which extend through and are secured to the sides of the trough. With these bolts B' as a means of retention it is to be noted that the glass-supports may be moved more or less laterally, which provides for variations in the position of the glass joint relatively to the trough and is important in that there is not the need of such nicety of adjustment as might be required if the support were not adjustable. The center pieces B extend up slightly above the main top level of the trough, so that the panes of glass lie slightly above the sides $a\ a'$, leaving a small space through which the drip-water may run and not contact with the trough sides, but may flow against the sides of the central support and be directed into the trough-channel. The sides $a\ a'$ of the main trough are cross-cut by openings or recesses which receive and support the ends of the combination trough and glass-supports C. These glass-supporting troughs are made in sections extending laterally between the lines of the main troughs and not only give bearing to the laterally-extending edges of the panes of glass, but are adapted also to catch the drip-water running down the panes and to pour it into the main trough-channel. Their construction and relative bearing is best seen in Fig. 2. It comprises the two exterior flanges $c$ resting on top the sides of the main trough at the corner of the sectional opening when the cross-troughs are in position; the two exterior sides $c'$ and the bottom $c^2$. The bottom plate is not continuous, but is extended up at about the center of the trough by the sides $c^3$ to form the interposed glass-rest $c^4$. As in the previous construction this glass-rest is extended up slightly above the main top level of the trough sides in order that they may not obstruct the flow of the drip-water, but that it may be directed into the trough-channel by the sides of the glass-support. I have just described this cross system of drainage and support as comprising troughs having central glass-supports extending above the level of their sides. More properly, perhaps, there is a central glass-support and channels at either side; but I do not wish to confine myself to the specific construction represented, for cross-troughs properly might be used having auxiliary glass-supports, as in the previous construction, and still be within the scope of my invention.

The panes of glass are held in place by means of the bow caps or strips D, which extend the length of each main trough and are of a width to span the joint between the two lines of panes. These caps are held in place by means of the bolts $d$, headed to the under side of the glass-rest, and extend up through the edges of the separated panes of glass and then up through a hole in the cap, and presenting their threaded ends uppermost receive the drawing and backing nut $d'$ upon the upper side of the cap. The joints where the panes of glass meet are leaded or puttied, and the structure is made practically water-tight.

Having thus fully described my invention, I claim and desire to secure by Letters Patent of the United States—

1. In a glazed structure the combination of a trough, a glass-support extending therefrom to above the main top level of its sides, a bolt extending crosswise the trough to hold the said support in adjusted position, a bolt headed to said glass-support and extending therefrom between the edges of the panes of glass, and a bow-cap and draw-nut to combine therewith for holding the panes of glass in adjusted position, substantially as described.

2. In a glazed structure, the combination of main troughs having cross-cut recesses, laterally-extending glass-supports resting at their ends within said recesses, the said supports being provided with side channels emptying into the main trough, the bottoms and exterior walls of which are adapted to fit against the bottom and walls of the said recesses in the main trough sides, and hold the said glass-supports in fixed position, substantially as described.

3. In a glazed structure, the combination of main troughs having cross-cut recesses, laterally-extending troughs resting with their ends within said recesses so as to pour into the main trough-channels, and comprising the exterior flanges $c$, the sides $c'$, the bottom $c^2$, and the interposed central glass-support having the sides $c^3$ and the glass-rest $c^4$, substantially as described.

JOSIAH H. STEFFEY.

Witnesses:
F. F. RAYMOND, 2d,
J. M. DOLAN.